United States Patent [19]

Haglid

[11] 3,890,317
[45] June 17, 1975

[54] PROCESS FOR S-METHYLATION OF 4-AMINO-6-T-BUTYL-3-MERCAPTO-1,2,4-TRIAZIN-5-ONE

[75] Inventor: Frank Runar Haglid, Wilmington, Del.

[73] Assignee: E. I. du Pont de Nemours & Company, Wilmington, Del.

[22] Filed: June 13, 1974

[21] Appl. No.: 478,969

[52] U.S. Cl. ............................................ 260/249.5
[51] Int. Cl............................................ C07d 55/10
[58] Field of Search ................................ 260/249.5

[56] References Cited
FOREIGN PATENTS OR APPLICATIONS
1,182,801    3/1970    United Kingdom 2,003,144    7/1971    Germany

*Primary Examiner*—John M. Ford

[57] ABSTRACT

4-Amino-6-t-butyl-3-mercapto-1,2,4-triazin-5-one is methylated to produce 4-amino-6-t-butyl-3-methylthio-1,2,4-triazin-5-one in the presence of base in aqueous medium, using methyl bromide as the alkylating agent. Superior product quality and yield are achieved by continuous removal of the product from the reaction medium.

7 Claims, No Drawings

PROCESS FOR S-METHYLATION OF 4-AMINO-6-T-BUTYL-3-MERCAPTO-1,2,4-TRIAZIN-5-ONE

BACKGROUND OF THE INVENTION

Preparation of 4-amino-6-t-butyl-3-mercapto-1,2,4-triazin-5-one (mercapto compound) is disclosed generally in United Kingdom Pat. No. 1,182,801, the disclosure of which is herein incorporated by reference. German Offenlegungschrift 2,003,144 discloses the methylation of 4-amino-6-t-butyl-3-mercapto-1,2,4-triazin-5-one to 4-amino-6-t-butyl-3-methylthio-1,2,4-triazin-5-one, a selective herbicide, employing methyl iodide and sodium hydroxide in aqueous methanol. This reaction works well under a variety of conditions, and generally less than 2% of the undesired by-product, 4-amino-6-t-butyl-3-mercapto-2-methyl-1,2,4-triazin-5-one (mercapto methyl compound) is produced.

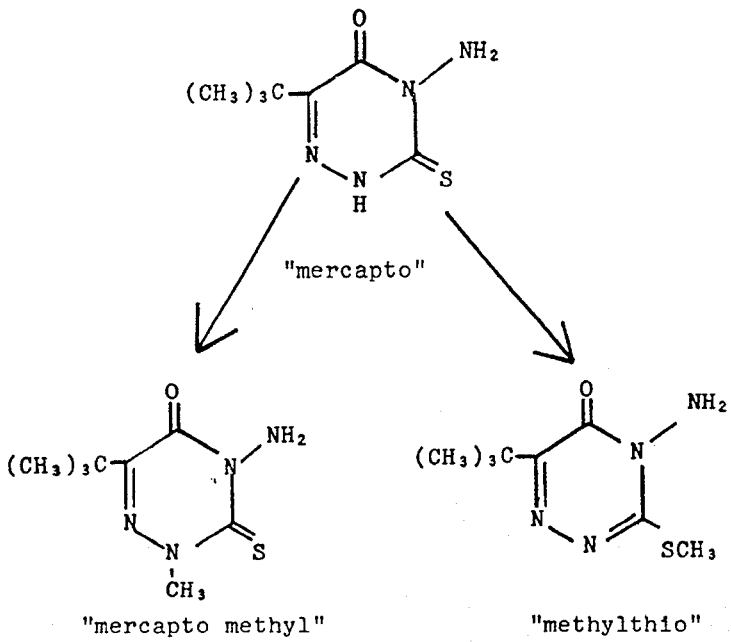

"mercapto"

"mercapto methyl"   "methylthio"

However, the use of methyl iodide in large-scale manufacturing is not practical because of its cost and limited availability. Therefore, alternative methylating agents were sought.

It was found that commonly used, inexpensive methylating agents such as methyl chloride, dimethyl sulfate and trimethyl phosphate all yielded mixtures of the methylthio and mercapto methyl compounds containing from 25 to 77% mercapto methyl compound, depending on methylating agent and reaction conditions used. Since methylthio and mercapto methyl compounds form 1:1 co-crystals, recovery of pure methylthio from such mixtures can only be achieved with great loss of material.

Use of methyl bromide as the methylating agent gives a yield of undesirable mercapto methyl compound of 4% under preferred conditions.

The mercapto compound, the starting material of this process, is made through a multi-step synthesis and is consequently expensive. Therefore, an increase in yield of the methylthio compound and a 50% reduction in the undesirable side product is very desirable.

SUMMARY OF THE INVENTION

It has been found that continuous removal of the methylthio compound from the reaction medium of the methyl bromide methylation reaction substantially reduced the formation of the undesirable mercapto methyl compound. Under the preferred conditions for methyl bromide methylation reaction, continuous removal of methylthio reduces the formation of mercapto methyl by at least 50 to below 2%.

In the process for methyl bromide S-methylation of the mercapto compound, the mole ratio of $CH_3Br$ to the mercapto compound should be in the range of 1:1 to 1.5:1. The preferred range is 1.05:1 to 1.2:1.

The reaction is conducted in the presence of a base; NaOH and KOH are suitable. NaOH is preferred because of cost.

The reaction must be conducted in water or a mixture of water and methanol, the weight ratio of water to methanol being at least 60:40.

The reaction is conducted at a pH in the range of 10–14, preferably at pH 11.7–12.3. Reaction temperatures are in the range of $-15°C$. to $+30°C$., preferably about $+5°C$. to $+15°C$.

The removal of the methylthio from the reaction mixture must be such that the concentration of solid methylthio compound in the reaction mixture is below 1% by weight.

DESCRIPTION OF THE INVENTION

The initial concentration of mercapto compound is not critical, but should be between 5 and 35%. A higher concentration of mercapto leads to process difficulties due to the physical properties of the reaction mixture. A lower concentration of mercapto requires process equipment of unnecessarily large volume and leads also to increased yield losses due to the water solubility of the methylthio compound. A concentration of 15–25% of mercapto is preferred. Mole ratio of $CH_3Br$ to mercapto should be in the range of 1:1 to 1.5:1. Less $CH_3Br$ gives incomplete reaction; more increases cost without process benefit and can lead to side reactions. The preferred range is about 1.05:1 to 1.2:1.

Methyl bromide can be added all at once or gradually. Gradual addition is preferred because it increases the purity of the product. Optimum methyl bromide feed rate during gradual addition is determined by several factors: mercapto compound concentration, pH, temperature, agitation and the cooling capacity of the system (the reaction is exothermic). It is preferred that the methyl bromide feed rate is adjusted so that a separate liquid methyl bromide phase (e.g. reflux) does not appear in the reaction system.

The reaction is conducted in the presence of a base; NaOH and KOH are suitable. NaOH is preferred because of cost.

The reaction must be conducted in water or a mixture of water and methanol in which the weight ratio of water to methanol is at least 60:40, preferably at least 75:25. Water alone is preferred, provided the reaction temperature is about 0°C. or higher. If a reaction temperature considerably below 0°C. is used, methanol is required to maintain a liquid phase.

The reaction is conducted at a pH in the range of 10–14, preferably at pH 11.7–12.3. At higher pH, loss of the mercapto and methylthio (and mercapto methyl) compounds occurs, due to basic hydrolysis. At lower pH, the formation of the mercapto methyl compound increases.

Reaction temperatures are in the range of −15°C. to +30°C., preferably at about +5°C. to +15°C. At lower temperatures, the rate of the reaction is slow. At higher temperatures, the formation of the mercapto methyl compound increases.

Pressure can be atmospheric or autogenous. If a closed reaction system is used, the autogenous pressure will depend upon mode of $CH_3Br$ addition and solvent system used, as well as on temperature. Use of atmospheric pressure requires a suitable condenser. Atmospheric pressure is preferred.

The process equipment should consist of a loop containing a cooled reactor, a pump, and a device such as a filter or a centrifuge for continuous removal of the solid methylthio compound from the reaction medium. The equipment to be used for this reaction system, the rate of circulation, and the rate of methyl bromide feed are not critical, provided that the concentration of solid methylthio compound in the reaction mixture is below 1% by weight. At higher solids concentration, formation of the undesired mercapto methyl side product rapidly approaches the level obtained without continuous solids removal. Reaction time will be about 0.5 to 5 hours, depending upon the reaction conditions. Shorter reaction times result in larger starting material recoveries. Longer reaction times are unnecessary and may lead to hydrolysis losses.

The alkali bromide of the spent process liquors can be recovered as taught in our copending application filed May 29, 1974, (Attorney's docket no. BA-80-72-1), by concentration and treatment with methanol and sulfuric acid to regenerate the methyl bromide.

The process can be run as a batch process or in a continuous mode. In a continuous process, the process stream must be purged to prevent alkali bromide build-up. This purge is neutralized to recover the mercapto starting material and then submitted to methyl bromide regeneration as described above.

EXAMPLE 1

A circular reaction system was built consisting of a one-liter resin kettle as reactor with a side arm for gravity-feeding the liquid medium into a gas-tight laboratory basket centrifuge (with stainless steel 325 U.S. wire mesh sieve as filter medium) followed by a rotating piston pump for return of the reaction liquid to the reactor. The reactor was further equipped with a dry-ice condenser, a stirrer, a pH probe, an addition funnel containing 2N sodium hydroxide for pH control, a dip tube for introducing methyl bromide, and an automatic temperature control system. To this reaction system was charged a solution of pH 12.0 containing 170 g. of 4-amino-6-t-butyl-3-mercapto-1,2,4-triazin-5-one (mercapto compound), around 69 g. of 50% sodium hydroxide, and water to a total volume of 850 ml. Pump and centrifuge were started, circulation through the system was adjusted to 800 ml./min., and cooling was applied. When the entire reaction system had stabilized at 10°C., 89 g. of methyl bromide was introduced through the dip tube at a constant rate during 83 min. Sodium hydroxide from the addition funnel was added as needed to maintain the pH of 12.0. After another hour of circulation, the experiment was terminated. The washed and dried centrifuge cake weighed 165.5 g., melted at 121-123°C., and was found by analysis to contain 98.0% 4-amino-6-t-butyl-3-methylthio-1,2,4-triazin-5-one, and 1.7% 4-amino-6-t-butyl-3-mercapto-2-methyl-1,2,4-triazin-3,5-dione. The clear centrifugate, on neutralization with sulfuric acid, yielded 10 g. of the mercapto compound starting material.

EXAMPLE 2

A reaction loop was built containing in order the following equipment: (1) a five-liter jacketed resin kettle with a bottom outlet, (2) a centrifugal pump, (3) a jacketed four-leaf pressure filter, and (4) a heat exchanger. The resin kettle was further equipped with a dry-ice condenser, a mechanical stirrer, a pH probe, an addition funnel containing 50% sodium hydroxide for pH control, and a dip tube for introducing methyl bromide. The temperature of the entire system was maintained at between 10°–13°C. by circulation of cooling water through the jackets of the resin kettle and filter, as well as through the heat exchanger. A solution of 1.2 kg. of the mercapto compound, 0.48 kg. of 50% sodium hydroxide, and 6.3 kg. water was charged and the pump was started. When the temperature had stabilized, the pH was adjusted to 12 and methyl bromide addition was started. While the rate of circulation through the loop was maintained at 10 liters/minute, 600 g. of methyl bromide was charged during 2 hours. The experiment was stopped after another hour of circulation. The weight of the washed and dried filter cake was 1130 g., containing 1.5% of the mercapto methyl compound. From the filtrate, 104 g. of mercapto compound was recovered.

EXAMPLE 3

Example 1 was repeated, but modified to demonstrate the effect of solids concentration above the critical value: At the start of the reaction, the entire external circulation loop was blanked off. Methyl bromide gas feed through the dip tube was started at the rate of 250 ml/min. After 15 minutes, the external loop was opened and the FMI pump adjusted to a circulation rate of 100 ml/min. The experiment was terminated as described in Example 1 yielding a product containing 3.8% of the mercapto methyl by-product.

EXAMPLE 4

Example 1 was repeated substituting potassium hydroxide for the sodium hydroxide used. The yield and purity of the product closely resembled that of Example 1.

EXAMPLE 5

Example 2 was repeated with the following modifications: A mixture of 5.0 kg water and 1.3 kg of methanol was substituted for the 6.3 kg water used. The reaction temperature was kept at between 3°–5°C., the methyl bromide addition time was increased to 3 hours, and the the hold time to 2 hours. The weight of the dry product obtained was 1157 g. containing 1.3% of the by-product. In addition, 74 g. of the unreacted starting material was recovered.

I claim:

1. In the process for methyl bromide S-methylation of 4-amino-6-t-butyl-3-mercapto-1,2,4-triazin-5-one, the improvement which comprises continuous product removal from the reaction mixture.

2. In the process for methyl bromide S-methylation of 4-amino-6-t-butyl-3-mercapto-1,2,4-triazin-5-one of claim 1 wherein:
   A. the mole ratio of methyl bromide to 4-amino-6-t-butyl-3-mercapto-1,2,4-triazin-5-one is in the range of 1:1 to 1.5:1, and
   B. the methylation is conducted
      1. in water or a mixture of water and methanol, the weight ratio of water to methanol being at least 60:40;
      2. in the presence of a base selected from hydroxides of sodium and potassium; and
      3. at pH in the range of 10–14, temperature in the range of −15°C. to +30°C., and at atmospheric or autogenous pressure, the improvement which comprises continuous product removal from the reaction mixture.

3. In the process for methyl bromide S-methylation of 4-amino-6-t-butyl-3-mercapto-1,2,4-triazin-5-one of claim 2 wherein:
   A. the mole ratio of methyl bromide to 4-amino-6-t-butyl-3-mercapto-1,2,4-triazin-5-one is in the range of about 1.05:1 to 1.2:1 and the methyl bromide is added gradually; and
   B. the methylation is conducted
      1. in the presence of sodium hydroxide; and
      2. at pH in the range of 11.7 to 12.3, temperature in the range of about +5°C. to +15°C., and at atmospheric pressure;

the improvement which comprises continuous product removal from the reaction mixture.

4. The process of claim 2 wherein the concentration of solid 4-amino-6-t-butyl-3-methylthio-1,2,4-triazin-5-one is maintained below 1% by weight of the reaction mixture.

5. The process of claim 3 wherein the concentration of solid 4-amino-6-t-butyl-3-methylthio-1,2,4-triazin-5-one is maintained below 1% by weight of the reaction mixture.

6. The process of claim 4 wherein the process is run as a batch process.

7. The process of claim 4 wherein the process is run as a continuous process.

* * * * *